UNITED STATES PATENT OFFICE.

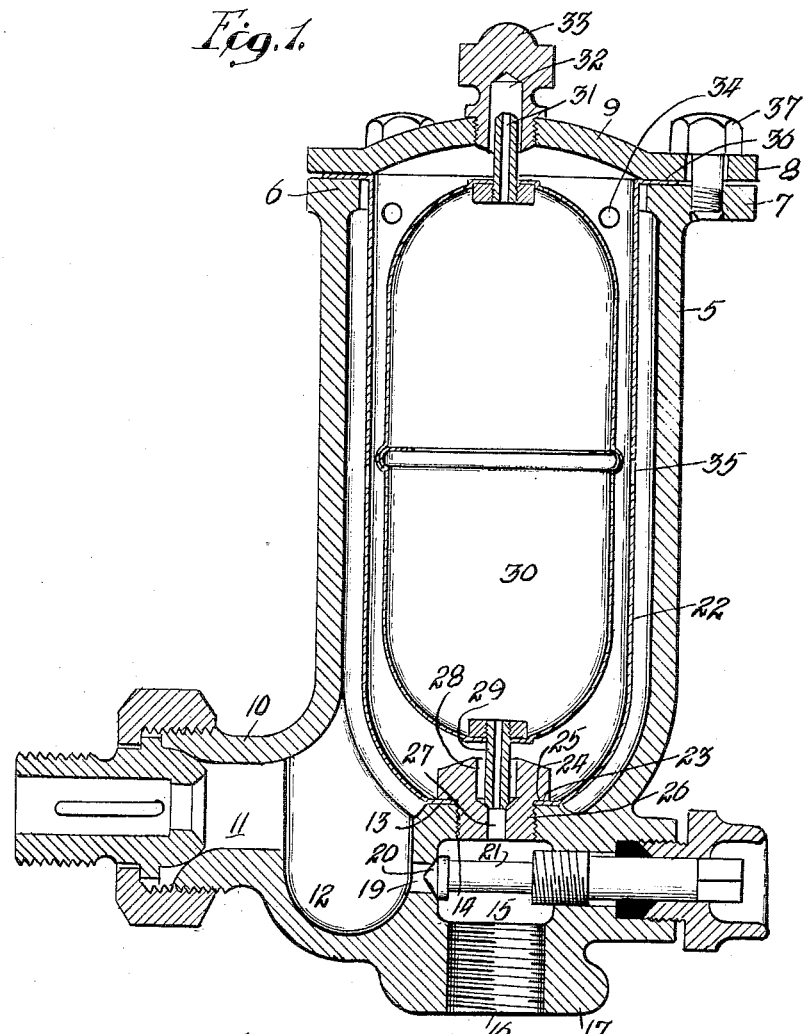

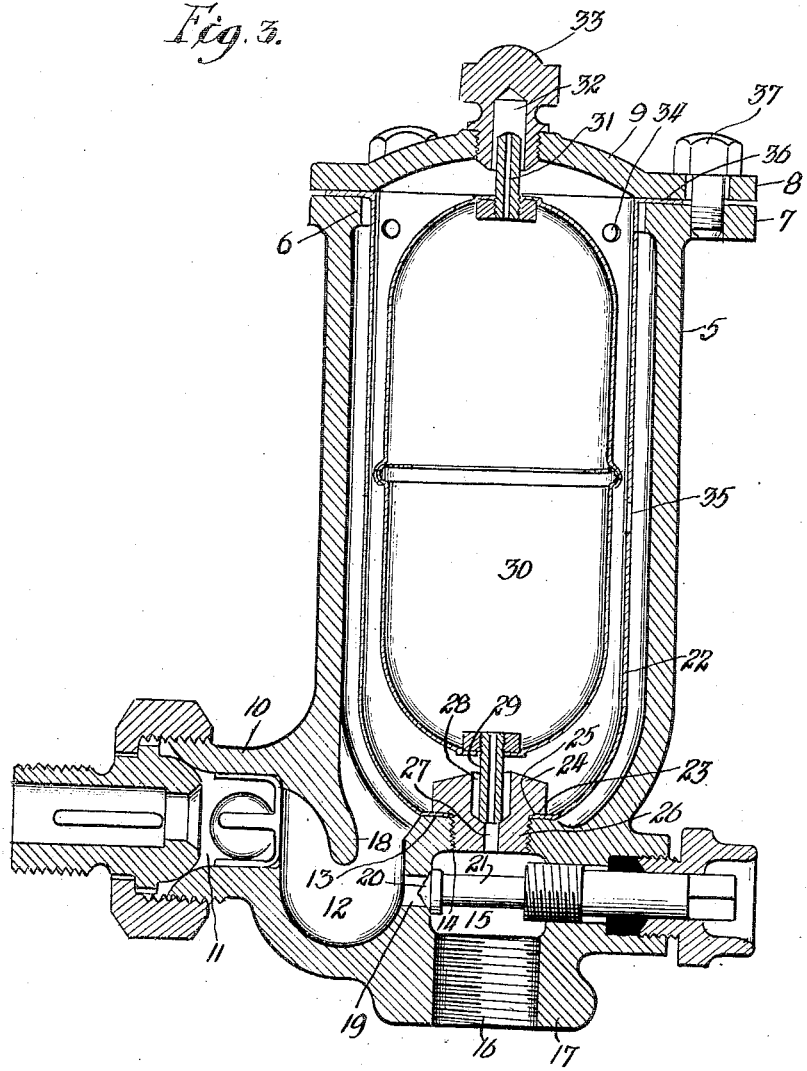

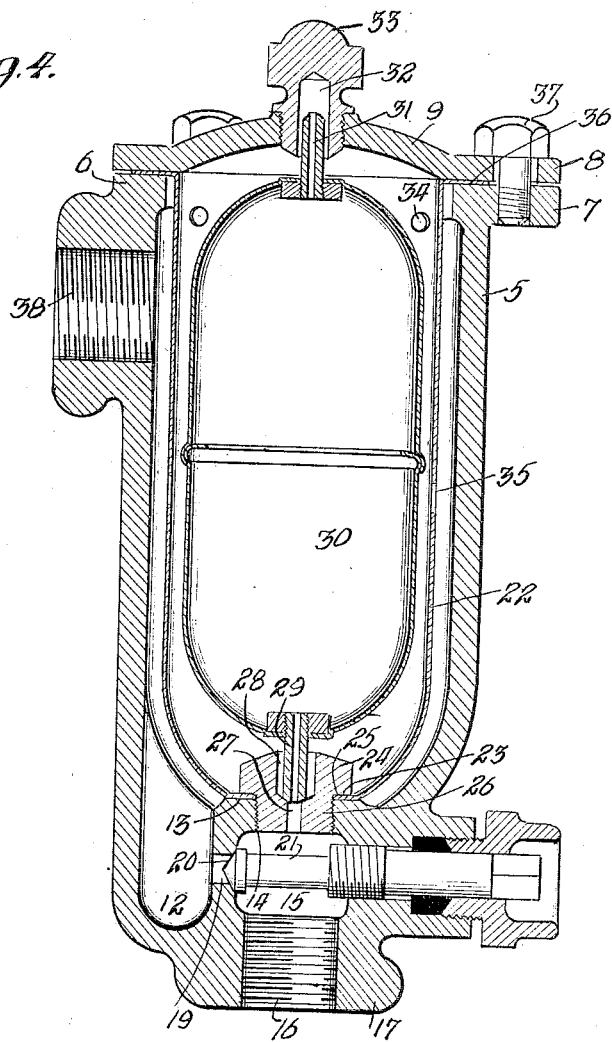

FRED W. LEUTHESSER, OF CHICAGO, ILLINOIS.

AIR AND WATER DISCHARGE VALVE FOR RADIATORS.

953,629.

Specification of Letters Patent. Patented Mar. 29, 1910.

Application filed December 18, 1909. Serial No. 533,801.

*To all whom it may concern:*

Be it known that I, FRED W. LEUTHESSER, a citizen of the United States, residing at Chicago, in the county of Cook and State of Illinois, have invented certain new and useful Improvements in Air and Water Discharge Valves for Radiators, of which the following is a specification.

The valve of the present invention is intended to be attached to the return end of a steam radiator, for the purpose of discharging air and water of condensation from the radiator without permitting the escape of a material volume of steam.

The present valve is of the type which employs a float for the purpose of regulating the discharge of the water of condensation; and the principal object of the invention is to protect the float from agitation due to the inrush of water by surrounding the float with an inner shell which lies intermediate the inlet passage and the float, so that the water admitted to the interior of the valve will be more or less distributed around the inner shell prior to its admission to the interior of the shell, which constitutes a protective float chamber and serves to guard the float against mechanical agitation and the noise occasioned thereby.

A further object of the invention is to so form the upper edge of the inner shell, by flanging the same, that the flange will serve as a soft metal gasket or packing interposed between the upper edge of the valve casing and the cover and afford a tight seal against the escape of steam or air at the joint. Another object of the invention is to so arrange the interior mechanism of the valve that the parts may be readily assembled or disassembled, as occasion may require. Further objects will appear from a detailed description of the invention, which consists in the features of construction and combination of parts hereinafter described and claimed.

In the drawings, Figure 1 is a sectional elevation of one form of the valve; Fig. 2, a cross sectional view of the inner shell, taken near the center thereof; Fig. 3, a sectional elevation of a valve, similar in all respects to the valve of Fig. 1, except for the addition of a baffle plate in the inlet passage; and Fig. 4, a sectional elevation of a valve, similar to Fig. 1, with the exception that the inlet passage is located near the top of the valve instead of near the bottom.

The valve as a whole comprises a casing 5 of generally cylindrical shape, which is open at its upper end, and is provided around its rim with a flange 6 outwardly projected at suitable points to afford ears 7 which are adapted to register with similar ears 8 formed around the rim of a cover 9. In the valve of Figs. 1 and 2 the casing is provided, on one side at its lower end, with a laterally extending tubular neck 10, which furnishes an inlet passage 11 communicating with a dished pocket 12 formed in the bottom of the casing. The wall of the pocket on the inner side extends upward and terminates in a flat floor 13, which is provided in its center with a tapped hole 14 which extends down to and merges into a discharge chamber 15, which discharge chamber communicates with an outlet passage 16 formed in a neck 17 which depends from the casing.

The valve of Fig. 2 is further provided with a baffle plate 18, which extends down part way into the dished pocket and serves to throw down dirt or sediment into the pocket, from which it may be blown out through a by-pass 19 which is controlled by means of a tapered by-pass valve 20 on the end of an adjustable stem 21, which extends laterally through and projects out from the side of the lower end of the casing. Within the casing is located an elongated cup-shaped inner shell 22, the lower end 23 of which is flattened and rests upon the flat floor of a casing, to which it is clamped by means of a valve plug 24 provided at its lower end with a shoulder 25 which bears against the inner side of the cup-shaped inner shell, and the lower end 26 of the valve plug is of reduced diameter and threaded into the hole in the floor of the casing.

The valve plug is provided, through its center, with a vertically extending water outlet port 27, which is enlarged at its upper end 28 to permit the discharge of water from the interior of the inner shell around the tubular valve member 29 which seats against the rim or mouth of the contracted portion of the water outlet port 27. The tubular valve member is carried by an elongated float 30, which is provided at its upper end with an upwardly extending tubular member furnishing an air inlet port 31, which tubular member operates within a guide recess 32 formed in a plug 33 which is screw-threaded through the center of the cover. The tubular member fits loosely within the guide recess, so that air may pass up around the tubular member and down therethrough, and into and through the float without difficulty.

In order to admit air to the interior of the casing, one or more air inlet holes 34 are provided near the upper end of the inner shell, and in order to admit water to the interior of the casing, one or more water inlet holes 35 are provided, which are preferably located at a point slightly below the line of flotation of the float.

The upper end of the inner shell is provided with an outwardly extending annular flange 36 which is interposed between the upper edge or rim of the casing and the superimposed cover, and is clamped between the two members by means of bolts 37 which are entered through the register ears formed on the casing and cover respectively. The inner shell is preferably made of a relatively soft metal, like copper, so that this interposed flange will furnish a soft metal packing or gasket, tightly sealing the joint against the escape of air or steam at this point. The arrangement, furthermore, serves to rigidly hold and clamp the upper end of the inner shell in position.

The valve of Fig. 4 is similar in all respects to the valve of Fig. 1, except for the fact that it is provided with an inlet passage 38 located near the top of the casing instead of near the bottom, as in the other figures.

The operation of the several forms of valves is substantially the same, except for the fact that the valves of Figs. 1 and 3, which have the inlet below the line of flotation of the float, furnish a water seal between the inlet passage and the point of discharge for the air, which water seal is not furnished within the valve of Fig. 4. Obviously, however, the valve of Fig. 4 could be attached, by suitable piping, to furnish a seal between the radiator and the point of discharge for the air, if such a seal were found desirable or necessary.

In the operation of all of the valves above described, the steam entering the radiator will drive the air before it, and this air, passing through the inlet passage, will find its way to the top of the casing and through the air inlet holes in the inner shell, whence it will pass through the tubular air inlet port carried by the float, and down through the float and through the tubular valve member to the point of discharge. After the air has been driven out, steam will enter the casing and pass to the interior of the inner shell. The steam, however, being moist and denser than the air, will have its escape retarded by the smallness of the passageway afforded by the air inlet port at the top of the float, so that no material volume of steam will escape. As water of condensation forms in the radiator, it will flow through the inlet passage and into the interior of the shell, but the current of water will be directed against the inner shell and not against the float, so that the float will be guarded against agitation due to the inrush of water, and the valve will be enabled to operate noiselessly, which is a matter of much importance, especially in hospitals, schools, lecture halls, or sleeping apartments. As the water rises in the bottom of the casing, it will flow through the holes in the inner shell until water has risen to a sufficient height to lift the float by flotation, thereby permitting some of the water to be discharged through the water outlet port and through the outlet passage which is connected to the return pipe of the system.

The arrangement of the inner shell is of importance, in that it not only protects the float against agitation but also eliminates the necessity for providing restricted passageways cored in the wall of the casing, which method of forming the valve is objectionable, for the reason that such restricted passageways are difficult of access and frequently become clogged during the operation of the valve, and their formation is such that cleaning is frequently difficult or impossible. In the case of the present valve, the water is delivered to the inner shell, which constitutes the float chamber proper, at a point considerably above the inlet passage, and this without the formation of any restricted passages in the shell. The inner shell is rigidly clamped and held both at the top and bottom, and at the same time the method of securing the shell is one which enables it to be quickly inserted in place or removed, so that easy access can be had to every portion of the valve, for the purpose of cleaning and repair, and at the same time the arrangement is one which obviates the necessity of frequent cleaning, by reason of the absence of restricted passages.

I claim:

1. In a valve of the class described, the combination of a casing provided with an inlet passage and a discharge passage, a float within the casing, for governing the discharge passage, an inner shell surrounding the float provided with a water inlet hole midway of its length and below the line of flotation of the float, and with an air inlet opening adjacent to its upper end, and having an imperforate body below the water inlet opening and between the water inlet opening and the air inlet opening and secured to the bottom of the casing, a cap or cover for closing the open upper end of the casing and inner shell, and means for discharging the air, substantially as described.

2. In a valve of the class described, the combination of a casing provided with an inlet passage and a discharge passage, a float within the casing, for governing the discharge passage, an inner shell surrounding the float provided with a water inlet hole midway of its length and below the line of flotation of the float, and with an air inlet opening adjacent to its upper end, and having an imperforate body below the water inlet opening and between the water inlet opening and the air inlet opening and secured to the bottom of the casing, a cap or cover for closing the open upper end of the casing and inner shell, and means for discharging the air through the float, substantially as described.

3. In a valve of the class described, the combination of a casing provided with an inlet passage and a discharge passage, a float within the casing, for governing the discharge passage, an inner shell surrounding the float provided with a water inlet hole midway of its length and below the line of flotation of the float, and with an air inlet opening adjacent to its upper end, and having an imperforate body below the water inlet opening and between the water inlet opening and the air inlet opening and secured to the bottom of the casing, and provided at its upper end with an outwardly extending flange, a cap or cover for closing the open upper end of the casing and shell and adapted to clamp and secure the flange on the inner shell, and means for discharging the air, substantially as described.

4. In a valve of the class described, the combination of a casing provided with an inlet passage and a discharge passage, a float within the casing, for governing the discharge passage, an inner shell surrounding the float provided with a water inlet hole midway of its length and below the line of flotation of the float, and with an air inlet opening adjacent to its upper end, and having an imperforate body below the water inlet opening and between the water inlet opening and the air inlet opening and secured to the bottom of the casing, and provided at its upper end with an outwardly extending flange, a cap or cover for closing the open upper end of the casing and shell and adapted to clamp and secure the flange on the inner shell, and means for discharging the air through the float, substantially as described.

5. In a valve of the class described, the combination of a casing provided with an inlet passage and a discharge passage, a float within the casing, a valve member depending from the float, an inner shell surrounding the float and provided with a water inlet hole and an air inlet hole, a shouldered valve plug communicating with the discharge passage and serving to clamp the inner shell to the floor of the casing, and provided with a water outlet port, a cover clamping the upper end of the inner shell, the valve member depending from the float being adapted when lowered to close the water outlet port, and means for discharging the air, substantially as described.

6. In a valve of the class described, the combination of a casing provided with an inlet passage and a discharge passage, a float within the casing, a valve member depending from the float, an inner shell surrounding the float and provided with a water inlet hole and an air inlet hole, a shouldered valve plug communicating with the discharge passage and serving to clamp the inner shell to the floor of the casing, and provided with a water outlet port, a cover clamping the upper end of the inner shell, the tubular valve member depending from the float communicating with the interior of the float, and adapted when lowered to close the water outlet port against the escape of water, and a member at the upper end of the float, furnishing an air inlet port to the interior of the float, substantially as described.

7. In a valve of the class described, the combination of a casing provided with an inlet passage and a discharge passage, a float within the casing, a valve member depending from the float, an inner shell surrounding the float and provided with a water inlet hole and an air inlet hole, a shouldered valve plug communicating with the discharge passage and serving to clamp the inner shell to the floor of the casing, and provided with a water outlet port, a cover clamping the upper end of the inner shell, the tubular valve member depending from the float communicating with the interior of the float, and adapted when lowered to close the water outlet port against the escape of water, a tubular guide member at the upper end of the float, furnishing an air inlet port to the interior of the float, and a recessed guide plug entered through the cover and serving to guide the tubular guide member, substantially as described.

8. In a valve of the class described, the combination of a casing provided with an inlet passage and a discharge passage, a float within the casing, a valve member depending from the float, an inner shell surrounding the float and provided with a water inlet hole and an air inlet hole, and provided at its upper end with an outwardly extending flange, a shouldered valve plug communicating with the discharge passage and serving to clamp the inner shell to the floor of the casing, and provided with a water outlet port, a cover clamping the flange at the upper end of the shell, the valve member depending from the float being adapted when lowered to close the water outlet port, and means for discharging the air, substantially as described.

9. In a valve of the class described, the combination of a casing provided with an inlet passage and a discharge passage, a float within the casing, a valve member depending from the float, an inner shell surrounding the float and provided with a water inlet hole and an air inlet hole, and provided at its upper end with an outwardly extending flange, a shouldered valve plug communicating with the discharge passage and serving to clamp the inner shell to the floor of the casing, and provided with a water outlet port, a cover clamping the flange at the upper end of the shell, the tubular valve member depending from the float communicating with the interior of the float, and adapted when lowered to close the water outlet port against the escape of water, and a member at the upper end of the float, furnishing an air inlet port to the interior of the float, substantially as described.

10. In a valve of the class described, the combination of a casing provided with an inlet passage and a discharge passage, a float within the casing, a valve member depending from the float, an inner shell surrounding the float and provided with a water inlet hole, and provided at its upper end with an outwardly extending flange, a shouldered valve plug communicating with the discharge passage and serving to clamp the inner shell to the floor of the casing, and provided with a water outlet port, a cover clamping the flange at the upper end of the shell, the tubular valve member depending from the float communicating with the interior of the float, and adapted when lowered to close the water outlet against the escape of water, a tubular guide member at the upper end of the float, furnishing an air inlet port to the interior of the float, and a recessed guide plug entered through the cover and serving to guide the tubular guide member, substantially as described.

FRED W. LEUTHESSER.

Witnesses:
SAMUEL W. BANNING,
EPHRAIM BANNING.